US008296553B2

(12) United States Patent
Cooper et al.

(10) Patent No.: US 8,296,553 B2
(45) Date of Patent: Oct. 23, 2012

(54) METHOD AND SYSTEM TO ENABLE FAST PLATFORM RESTART

(75) Inventors: Barnes Cooper, Tigard, OR (US); Faraz A. Siddiqi, Portland, OR (US); Michael R. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 12/274,276

(22) Filed: Nov. 19, 2008

(65) Prior Publication Data

US 2010/0125723 A1 May 20, 2010

(51) Int. Cl.
*G06F 15/177* (2006.01)
(52) U.S. Cl. .................................. 713/1; 713/2
(58) Field of Classification Search ............ 713/1, 2, 713/100
See application file for complete search history.

(56) References Cited

U.S. PATENT DOCUMENTS

| 5,185,877 A | 2/1993 | Bissett et al. | |
|---|---|---|---|
| 6,434,696 B1 | 8/2002 | Kang | |
| 2006/0005002 A1* | 1/2006 | Zimmer et al. | 713/1 |
| 2006/0242398 A1* | 10/2006 | Fontijn et al. | 713/2 |
| 2008/0184050 A1 | 7/2008 | Yamaji et al. | |

FOREIGN PATENT DOCUMENTS

| JP | 2002-082808 A | 3/2002 |
| JP | 2005-234872 A | 9/2005 |
| JP | 2006515940 A | 6/2006 |
| WO | 2004/046920 A2 | 6/2004 |

OTHER PUBLICATIONS vol. 2: Platform Initialization Specification, Driver Execution Environment Core Interface, Version 1.1, Incorperates Errata through Apr. 25, 2008, pp. 1-212.
Intel, Extensible Firmware Interface Specification, Version 1.02, Dec. 12, 2000, pp. 1-494.
Search Report for European Patent Application No. 09252648.2 Jul. 21, 2010, 4 pages.
First Office Action issued Apr. 23, 2012 from Japanese Application No. P2009-262302, 6 pages.

* cited by examiner

*Primary Examiner* — Dennis M Butler
(74) *Attorney, Agent, or Firm* — Schwabe, Williamson & Wyatt, P.C.

(57) ABSTRACT

A method and system to perform a fast reset or restart of a platform by minimizing the hardware initialization of IO devices in the platform during a restart of the platform. The basic input/output system (BIOS) of the platform traps any software initiated reset request (SIRR) or warm reset. The BIOS restores the input/output (IO) devices coupled with the platform to their previous hardware state to avoid the full platform initialization when the SIRR is trapped. The restart of the platform can be performed in a fast manner as the full platform initialization is minimized.

27 Claims, 7 Drawing Sheets

METHOD AND SYSTEM TO ENABLE FAST PLATFORM RESTART

FIELD OF THE INVENTION

This invention relates to a platform, and more specifically but not exclusively, to enable fast restart of the platform by minimizing hardware initialization of input/output (IO) devices connected with the platform during the restart of the platform.

BACKGROUND DESCRIPTION

During the operation of a platform, it is highly desirable to have continuous uptime or continuous accessibility of the platform. The ability of the platform to run continuously is important to end users and is especially important to the enterprise because it may affect the operations of the enterprise. The uptime and reliability of a platform is often measured and referred to as the 5 9's, i.e. 99.999% availability. In the enterprise, when a platform is unavailable for greater than 5¼ minutes in one year, it cannot be designated as meeting the 5 9's. The sale of a platform targeted for the enterprise is often determined by the ability of the platform to meet the 5 9's.

One of the factors affecting the uptime of a platform is the need to restart or reset the platform. When the platform is being restarted, the time taken for the restart is considered as downtime and it affects the availability of the platform. Some of the myriad reasons for the need to restart the platform include re-initializing the operating system (OS) running on the platform due to the loading of new OS drivers, new software or new software patches. The OS may determine that it needs to restart the platform to update its registry keys or to restart the OS environment.

However, in certain instances, it may not be necessary to restart the whole platform to allow the OS to update its registry keys or to restart the OS environment. In one instance, when there are no hardware changes to the platform and when only software changes to the platform are required, it is not necessary to restart the whole platform and reinitialize all the hardware again. Conventional platforms, however, perform a full platform reset even when there are no hardware changes to the platform and when only software changes to the platform are required.

Figure 1A:
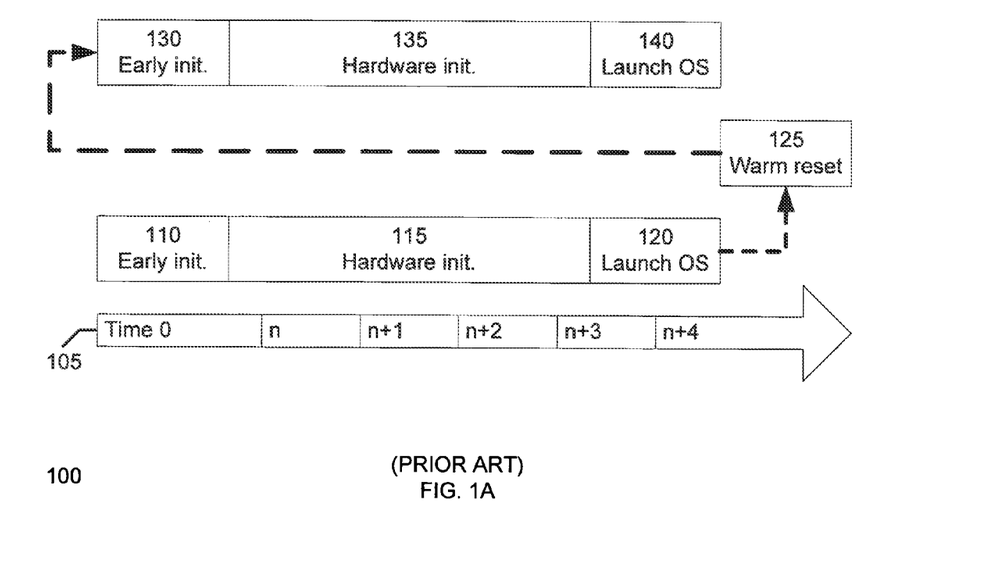
FIG. 1A depicts a restart sequence of a conventional platform (prior art)

FIG. 1A depicts a prior art restart sequence 100 of a conventional platform that supports legacy based basic input/output system (BIOS). Timeline 105 shows a time reference of the restart sequence 100. When the conventional platform is powered on at time 0, it enters the phase 110 of early initialization. In the phase 110, the central processing unit (CPU) is powered up and it executes the BIOS code that resides at its reset vector. The BIOS may perform basic checks of the platform such as power on self tests (POST) and memory tests. After the checks are done, the BIOS initiates the next phase 115 of hardware initialization. The BIOS detects the IO devices connected or plugged in the platform and performs initialization tasks such as peripheral component interconnect (PCI) enumeration, launching option read only memory (ROM) or polling IO devices in the phase 115.

When the phase 115 of hardware initialization is completed, the OS is launched in the phase 120. During the operation of the platform, a software initiated reset request or a warm reset may be encountered. Phase 125 depicts the platform receiving a warm reset request. On receipt of the warm reset request, the platform performs a full platform reset and enters again the phase 130 of early initialization, the phase 135 of hardware initialization and the phase 140 of launching the OS.

BRIEF DESCRIPTION OF THE DRAWINGS

The features and advantages of embodiments of the invention will become apparent from the following detailed description of the subject matter in which.

DETAILED DESCRIPTION

Reference in the specification to "one embodiment" or "an embodiment" of the invention means that a particular feature, structure or characteristic described in connection with the embodiment is included in at least one embodiment of the invention. Thus, the appearances of the phrase "in one embodiment" appearing in various places throughout the specification are not necessarily all referring to the same embodiment.

Embodiments of the invention enable a platform to perform a fast reset or restart by minimizing the hardware initialization of IO devices connected with the platform during the restart of the platform. A platform includes, but is not limited to, a server, a desktop computer, a mobile computer, a workstation, or any computing device that can receive a warm reset request to restart the computing device. The platform contains IO devices that include, but are not limited to, hard disk drives, solid state drives, memory modules, processors, chipsets, video display cards, sound cards, compact disc drives, floppy disk drives, or any other IO devices that perform functions for the platform. A warm reset request is a software initiated reset request (SIRR) that is initiated by the OS running on the platform or by a local or a remote user of the platform. An event in the OS that triggers the warm reset in the platform includes, but is not limited to, receiving a reboot or restart request from a local or remote user of the platform and a restart request after the OS installs a new software module or a new software patch.

Figure 1B:
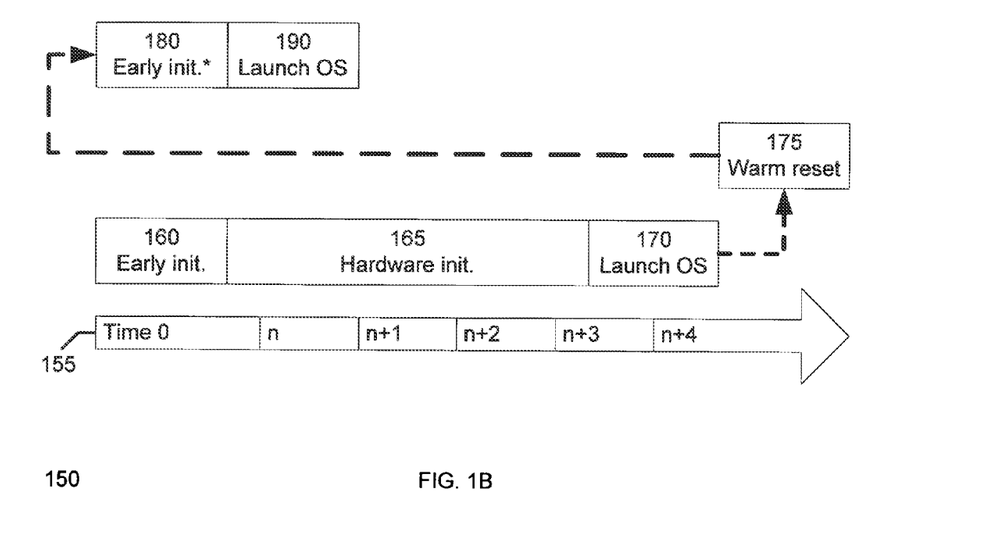
FIG. 1B depicts a restart sequence of a platform in accordance with one embodiment of the invention.

FIG. 1B depicts a restart sequence 150 of a platform that supports legacy based BIOS in accordance with one embodiment of the invention. The phase 160 of early initialization is similar to the phase 130 described in FIG. 1A. In one embodiment, the BIOS of the platform is modified to detect and to trap a warm reset request of the platform. The phase 160 performs early initialization of basic checks of the platform such as power on self tests (POST) and memory tests. After the checks are done, the modified BIOS initiates the next phase 165 of hardware initialization. The hardware initialization of phase 165 is similar to the hardware initialization of phase 115.

In another embodiment, the BIOS of the platform is modified to save the previous hardware state of some or all of the IO devices connected to the platform in the phase 165. The hardware state of the IO devices includes, but is not limited to, the register settings of the IO devices, and the configuration settings determined by the BIOS during PCI enumeration.

For example, when the BIOS performs PCI enumeration and detects a hard disk drive connected to the platform, the BIOS requests information from the hard disk drive such as the type of hard disk drive, or the mode (master or slave) of the drive for example. The BIOS determines the optimal settings for the transfer speed based on the information that it gets from the hard disk drive. The optimal settings for the hard disk drive are saved by the modified BIOS so that the optimal settings for the hard disk can be re-programmed during a restart of the platform. By having the optimal settings saved, it avoids the need of the BIOS to request information from the hard disk drive and determine the optimal setting each time the platform is restarted during a warm reset.

After phase 165 of hardware initialization completes, the OS is launched in phase 170 and a warm reset request by the OS is sent to the platform in phase 175. In phase 180 of early initialization, the modified BIOS detects and traps the warm reset request. When the warm reset request is trapped, the modified BIOS converts the warm reset request into a CPU only initialization reset request. By converting the warm reset request into a CPU only initialization reset request, the IO devices in the platform no longer receive a reset request to perform self initialization. The full BIOS code executed in phase 130 of FIG. 1A is not executed by the CPU in phase 180 of FIG. 1B. The modified BIOS code of phase 180 performs a basic CPU initialization and restores the IO devices in the platform to their previous hardware states by reprogramming the IO devices with their previous hardware state saved in phase 165. In one embodiment, the BIOS reprograms the registers of the IO device with the saved register setting of the previous hardware state of the IO device.

After phase 180 completes, the platform bypasses the conventional hardware initialization phase 135 and enters phase 190 to re-launch or restart the same version of the OS that was loaded previously in phase 170. Timelines 105 and 155 show a reference time saving of the restart sequence 150 as compared to the restart sequence 100. The time required to perform a restart of the platform in FIG. 1B (phase 180 and phase 190) is shorter than the time required to perform a restart of the platform in FIG. 1A (phase 130, phase 135 and phase 140).

With a small BIOS code that is executed in phase 180 of early initialization and minimizing the need of the IO devices in the platform to perform self initialization, the restarting of the platform is performed in a fast manner. The platform of FIG. 1B does not perform a full platform reset when there are no hardware changes to the platform and when only software changes to the platform are required. Rather, when a warm reset request is received by the platform, only part of the platform necessary for a software event to reinitialize itself is reset.

In one embodiment of the invention, the platform overhead associated with the restarting of the platform is reduced. The minimization of the hardware initialization in the platform is one way of reducing the platform overheads and other methods to reduce the platform overheads can also be performed to allow a fast restart of the platform. A faster restart of the platform yields the ability to ensure more platforms in the enterprise can maintain the 5 9's due to lower platform overhead associated with the installation of software patches and regular maintenance.

Figure 2:
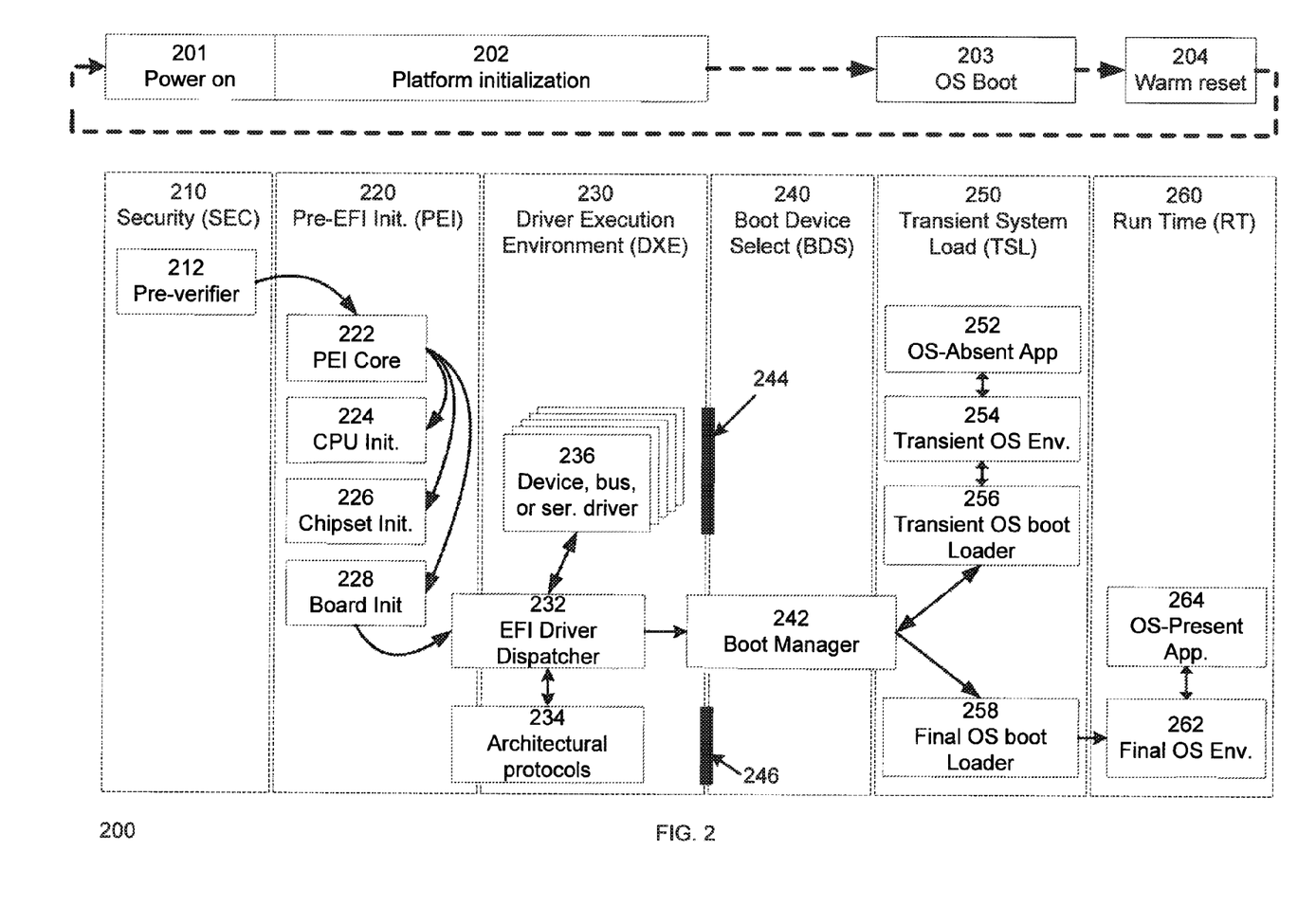
FIG. 2 depicts a boot flow of a platform.

FIG. 2 depicts a boot flow 200 of a platform that supports extensible firmware interface (EFI) or unified EFI (UEFI). In one embodiment, the UEFI in the platform is implemented based on Intel® Platform Innovation Framework for EFI and hereinafter referred to as the "Framework". The boot flow 200 includes, but is not limited to, the phase 201 when the platform is powered on, the phase 202 when the platform is initialized, the phase 203 when the OS is booting, the phase 204 when a warm reset request is received by the OS. The boot flow 200 goes back to the phase 201 when the platform is restarting.

During the power on phase 201 of the boot flow 200, the platform enters the security (SEC) phase 210 of the Framework. The pre-verifier 210 handles all platform restart events that includes, but are not to, applying power to the platform from an unpowered state, restarting the platform from an active state and receiving various exception conditions. The next phase in the boot flow 200 is the platform initialization phase 202. The platform initialization phase 202 includes the pre-EFI initialization (PEI) phase 220 and the Driver Execution Environment (DXE) phase 230 of the Framework.

After the SEC phase 210, the PEI phase 220 configures the platform to meet the minimum prerequisites for the DXE phase 230 of the Framework architecture. During the PEI phase 220, the PEI core 222 initializes key IO devices such as the CPU 224, the chipset 226 and the motherboard 228. The PEI core 222 also initializes all other key IO devices in the platform that are not shown in FIG. 2. After the PEI phase, the EFI driver dispatcher 232 loads the device drivers bus drivers or serial drivers 236 of the IO devices connected in the platform during the DXE phase 230. The architectural protocols 234 are also loaded at this phase. Elements 244 and 246 depict the UEFI interfaces for the devices drivers 236 and architectural protocols 246.

After the DXE phase 230, the boot device select (BDS) phase 240 is entered. The boot manager 242 determines the mass storage drive to boot an OS for the platform and also which OS to be loaded in the platform when multiple operating systems are present or installed in the platform. The boot flow 200 enters the OS boot phase and the platform enters the transient system load (TSL) phase 250 of the Framework. The boot manager 242 toads the transient OS boot loader 256 and the transient OS boot loader 256 starts the transient OS environment 254. OS absent applications 252 may be launched by the transient OS environment 254. The final OS boot loader 258 is launched after the transient OS boot loader 256 is completed.

In one embodiment, the boot manager 242 is modified to load the image of the final OS loader twice and to copy the image into a cache. In other embodiments, the boot manager 242 toads the final OS boot loader twice and saves the first copy of the final OS boot loader image as an unaltered memory based source and launches the second copy of the final OS boot loader image. In other embodiments, a part image or a whole image of the OS may also be copied as an unaltered memory based source to allow restoration of the part or whole image of the OS.

The platform enters the run time (RT) phase when the final OS boot loader 258 initiates the final OS environment 262 and executes OS present applications 264. When a warm reset request is received by the OS during the RT phase the boot flow 200 goes back to the power on phase 201 to restart the platform and enters again the platform initialization 202 phase and the OS boot phase 203.

Figure 3:
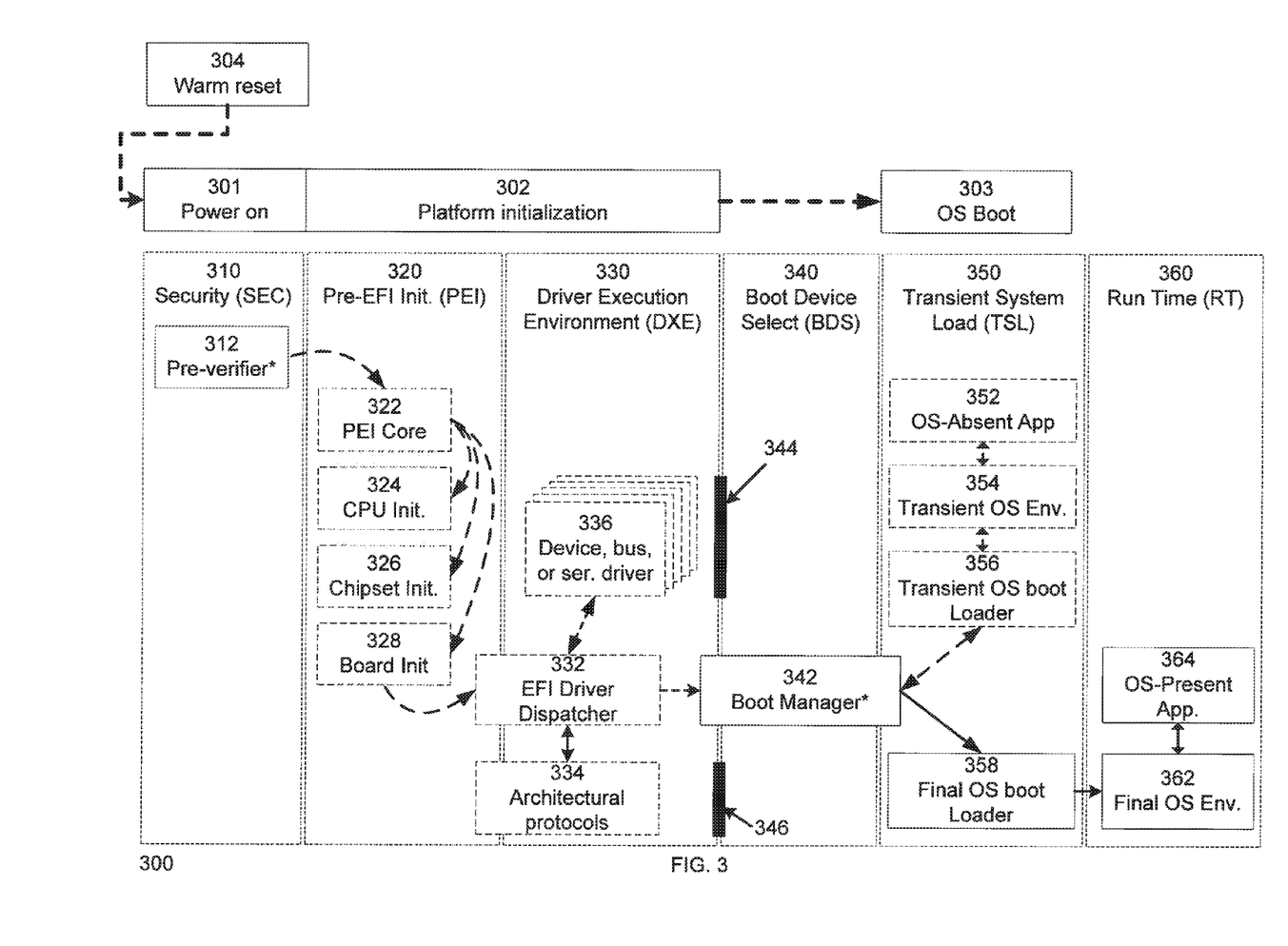
FIG. 3 depicts a restart sequence of a platform in accordance with one embodiment of the invention.

FIG. 3 depict a restart sequence 300 of a platform in accordance with one embodiment of the invention. The platform receives a warm reset request 304 from the OS. In one embodiment, the warm reset request 304 is followed from the boot flow 200. The platform enters the power on phase 301 when the warm reset request is received. The pre-verifier 312 is modified to detect and trap any warm reset request. The pre-verifier 312 is also modified to convert the warm reset into a CPU only initialization reset request when the warm reset is trapped.

When the pre-verifier 312 detects the warm reset 304, it traps the warm reset 304 and converts the warm reset 304 into a CPU only initialization reset request. The platform initializes the CPU and the pre-verifier restores the IO devices in the platform to their previous hardware states. In one embodiment, the pre-verifier calls the block_IO.reset function of the Framework that restores each IO device to a known state. The restart sequence 300 avoids the platform initialization phase 302 and the PEI phase 320 and DXE phase 330 are not executed as the IO devices in the platform are restored by the pre-verifier 312 to a known hardware state or its previous hardware state.

The steps of executing the PEI core 322, of initializing the CPU 324, chipset 326 and the motherboard 328 are not performed and they are represented by dashed lines. In addition, the EFI driver dispatcher 332, device drivers 336 and the architectural protocols 334 are not re-loaded and they are also represented by dashed lines. The pre-verifier 312 calls the boot manager 342 in the BDS phase 340. In one embodiment, the boot manager 342 restores the final OS boot loader 358 with the copy of the final OS boot loader image saved during the BDS phase 340. In other embodiments, the boot manager 342 may also be modified to load additional images from the boot disk of the platform to speed up the restart of the platform.

The steps of executing the transient OS boot loader 356, the transient OS environment 354, and the OS absent applications 352 are not performed as the previous OS loader image is used and they are represented as dashed lines. The final OS boot loader 358 is executed using the copy of the final OS boot loader image saved during the BDS phase 340 and the final OS environment 362 and OS present applications 364 are executed in the RT phase 360.

Figure 4:
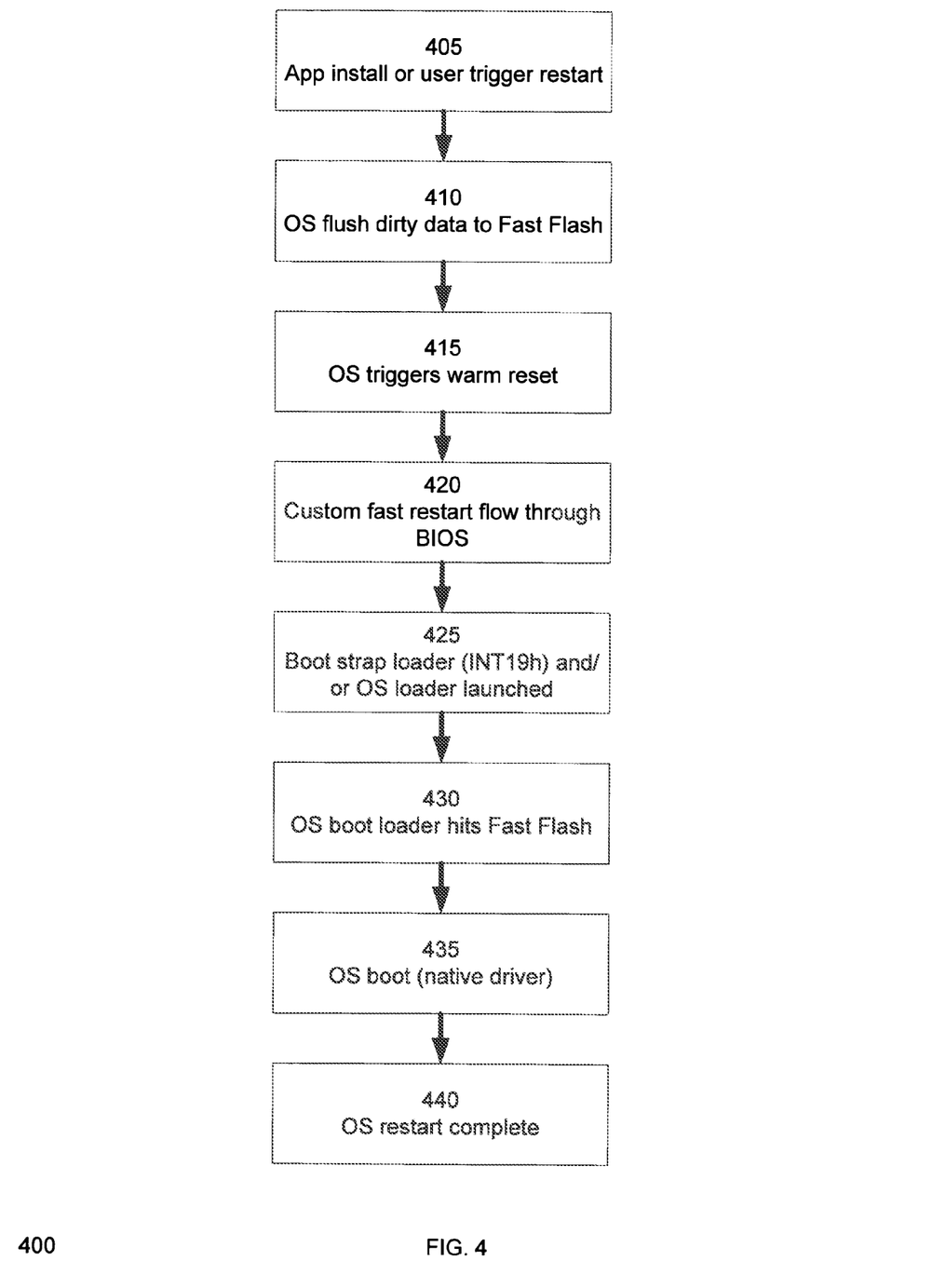
FIG. 4 depicts a flowchart of a platform restart in accordance with one embodiment of the invention.

FIG. 4 depicts a flow diagram of the restart sequence of a platform in accordance with one embodiment of the invention. At step 405, a warm reset request is received by the OS running on the platform. In some embodiments, the warm reset request to restart the platform is triggered by an installation of an application in the OS or is triggered by a local or remote user of the platform. The OS initiates the transition of the platform into a power off state. In some embodiments, the OS initiates the transition of the platform into system power state 5 (S5).

In step 410, the platform starts to perform a shutdown of the OS and the OS flushes the dirty data in the OS to a mass storage device. The mass storage device includes, but is not limited to, a hard disk drive, a fast flash drive, a solid state memory, universal serial bus (USB) drive, or any form of data storage means for the platform. No write back to the mass storage device is performed. In one embodiment, the dirty data is flushed to a write back (WB) cache.

After the dirty data is flushed in step 410, the OS shutdowns and triggers a warm reset in step 415. In one embodiment, the warm reset is triggered by writing to an onboard keyboard controller via port 64 h to perform a warm reset of the platform. In step 420, the platform executes a custom fast restart flow through the BIOS. In one embodiment, the custom fast restart flow 420 is performed by the modified BIOS 180 discussed in FIG. 1B. In other embodiments, the custom fast restart flow 420 is performed by the pre-verifier 312 discussed in FIG. 3. Both the modified BIOS 180 and pre-verifier 312 detects and traps the warm reset request and converts the warm reset into a CPU only initialization reset request. The IO devices in the platform are restored to a previous hardware state by the modified BIOS 180 or pre-verifier 312.

In step 425, the modified BIOS issues an interrupt 19 h (hex) to load the OS. In another embodiment, the pre-verifier launches boot manager 342 to restore the OS boot loader with a copy of the previous OS loader image. The OS boot loader hits a fast flash drive by issuing an interrupt 13 h (hex) in step 430. The OS is booted using native drivers in step 435 and the OS restart completes in step 440.

Figure 5A:
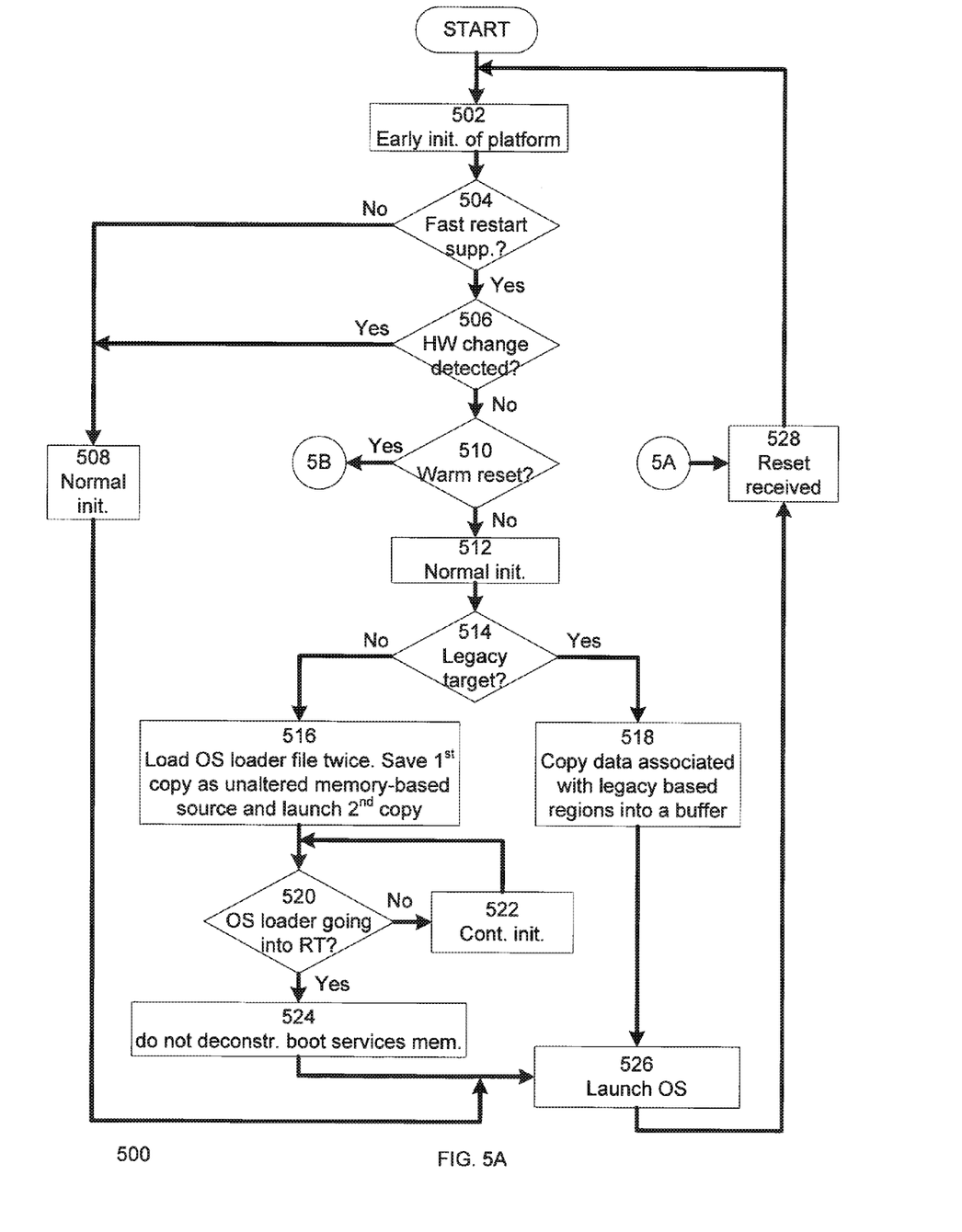
FIG. 5A depicts a flowchart of a platform restart in accordance with one embodiment of the invention.

FIG. 5A illustrates the flowchart of the restart sequence of a platform that supports legacy based BIOS or the Framework according to one embodiment of the invention. In step 502, the platform enters an early initialization phase and the CPU and memory of the platform are powered up. The CPU executes the BIOS code that resides at its reset vector and performs basic checks of the platform such as power on self tests (POST) and memory tests. In step 504, the flow checks if fast restart of the platform is supported. If no, the flow goes through normal hardware initialization of the platform in step 508. During the normal hardware initialization, IO devices connected or plugged in the platform are detected and tasks such as peripheral component interconnect (PCI) enumeration, launching option read only memory (ROM) or polling IO devices are executed. If yes, the flow checks if the current hardware configuration of the platform is different from the platform's previous hardware configuration at step 506.

If the hardware configuration is changed, the flow goes to step 508 to perform normal initialization of the platform. If the hardware configuration is not changed, the flow goes to step 510 to detect if there is a warm reset request. If yes, the flow goes to step 58. Step 5B is discussed in FIG. 5B. If no, the flow goes to step 512 to perform normal initialization of the platform. In one embodiment, the steps 502, 504, 506, and 510 are performed by the modified BIOS 180 discussed in FIG. 1B. In another embodiment, the steps 502, 504, 506, and 510 are performed by the pre-verifier 312 of FIG. 3. Step 512 of normal initialization is executed during the PEI 320 phase and the DXE 330 phase. Although steps 506 and 508 show that the platform does not perform fast platform restart when hardware changes are detected, in other embodiments, the flow can be modified to allow the platform to support fast platform restart when hardware changes are detected. For example, the flow detects the new IO device(s) connected in the platform and performs normal initialization of the new IO device(s) and the flow continues to step 510.

After step 512, the flow goes to step 514 to check if the platform supports legacy based BIOS. If yes, the flow goes to step 518 to copy the data in the legacy based BIOS memory region of the platform into a buffer. The data in the legacy based BIOS memory region includes, but is not limited to, data in the BIOS data area (BDA) and data in the extended BIOS data area (EBDA). In one embodiment, the buffer is indicated as unavailable to the OS or to an OS loader in a memory map of the platform. In another embodiment the copied data is pre-fixed with a signature and placed at a particular memory granularity of the buffer such that it is discoverable by the platform.

If the platform does not support legacy based BIOS in step 514, the flow goes to step 516. Step 516 loads the OS loader twice and saves the first copy of the OS loader image as an unaltered memory based source and launches the second copy of the OS loader image. In other embodiments, a part image or a whole image of the OS may also be copied as an unaltered memory based source to allow restoration of the part or whole image of the OS. In step 520, the flow checks if the OS loader is attempting to transition into runtime. If no, the flow continues the OS initialization of the platform in step 522. If yes, the flow maintains the boot services memory to facilitate ability of the platform to retain its firmware infrastructure during the restart of the platform in step 524.

In one embodiment, the steps 516, 520, 522, 524 are performed by the boot manager 342 in the BDS phase of a platform that supports EFI or the Framework. The boot manager does not deconstruct the boot services memory when it receives a call to the function ExitBootServices of the Framework. From steps 508, 518 and 524, the OS is launched in step 526. In step 528, the flow receives a reset and goes back to step 502 to perform early initialization of the platform.

Figure 5B:
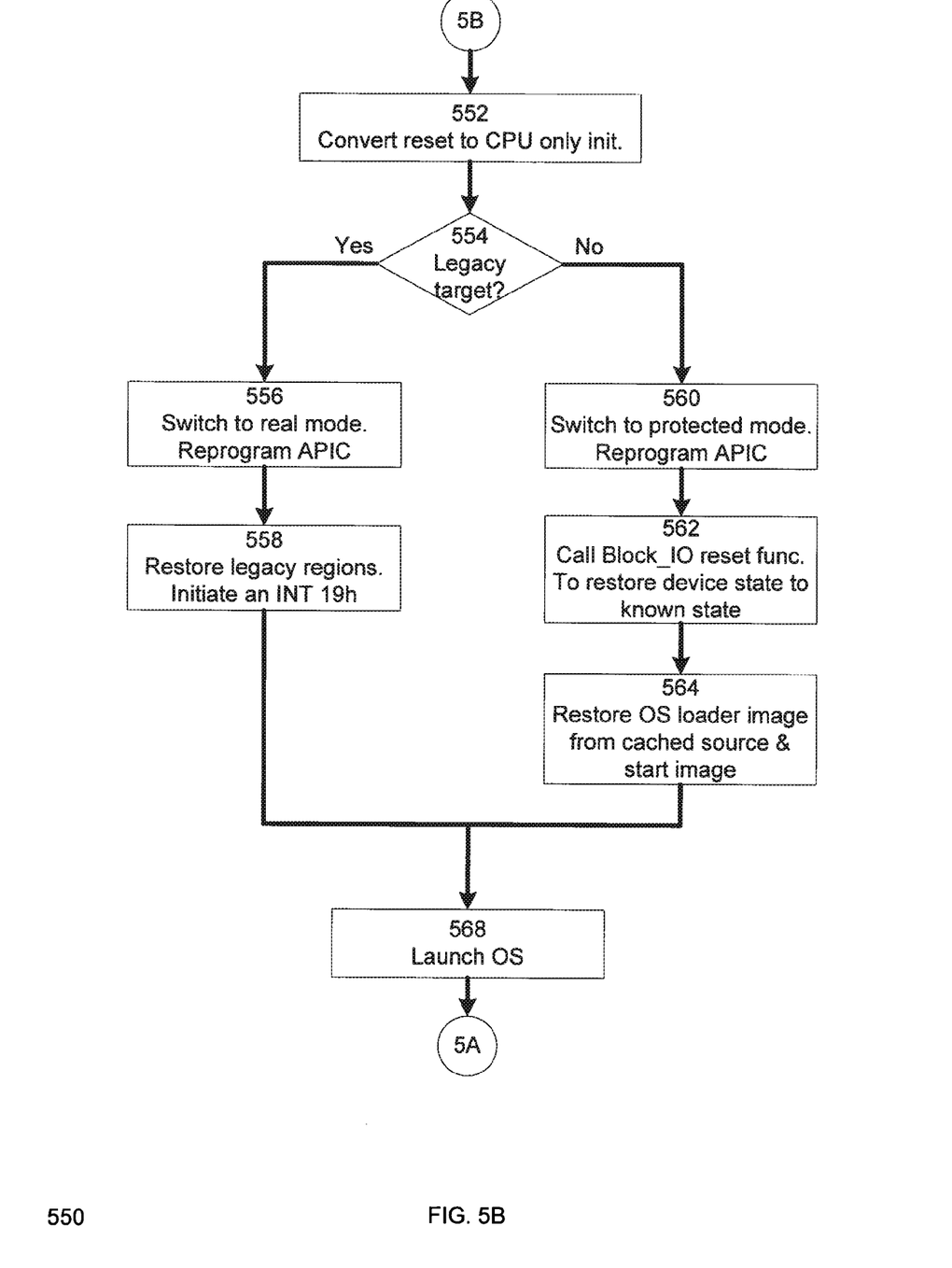
FIG. 5B depicts a flowchart of a platform restart in accordance with one embodiment of the invention.

FIG. 5B illustrates the flowchart when step 510 detect that there is a warm reset request. In one embodiment, the steps 552, 554, 556, and 558 are performed by the modified BIOS 180 discussed in FIG. 1B. In another embodiment, the steps 552, 554, 560, 562 and 564 are performed by the pre-verifier 312 of FIG. 3. In step 552 the modified BIOS 180 or pre-verifier 312 detects and traps the warm reset request. The modified BIOS 180 or pre-verifier 312 also converts the warm reset request into a CPU only initialization reset request. The CPU is initialized to its previous state or to a known state. In step 554, the flow checks if the platform supports legacy based BIOS. If yes, the modified BIO 180 switches the CPU of the platform into real mode and reprograms the advanced programmable interrupt controller (APIC) in step 556. The modified BIOS 180 restores the legacy based BIOS memory region to its previous values using the copied data of its previous values in step 518. In step 558 the modified BIOS 18 initiates a boot strap loader via interrupt 19 h (hex) to launch the OS to restart the platform.

If the platform does not supports legacy based BIOS and supports EFI or the Framework, the pre-verifier 312 switches the CPU of the platform into protected mode and reprograms the advanced programmable interrupt controller (APIC) in step 560. The pre-verifier 312 in step 562 restores the IO devices in the platform to their previous hardware state or to a known state. In one embodiment, the pre-verifier 312 calls a block_io reset function of the Framework that reset each IO device to a known state or previous hardware state. The block_io reset function may be implemented for each IO device or implemented collectively for all IO devices.

In step 564, the OS loader of the platform is restored with the copy of the previous OS loader image saved in step 516. The OS is launched with the OS loader image saved in step 516. Although step 564 restores only the OS loader image, in other embodiments, step 564 may restore other images that allow the platform to restart in a fast manner. Step 564, and 558 goes to step 568 to launch the OS and the flow goes back to step 5A. Although flowcharts 5A and 5B depict a restart sequence for a platform that supports legacy based BIOS or EFI, it is not meant to be limiting. Other forms of booting firmware may also be supported by embodiments of the invention to enable fast restart of the platform.

Figure 6:
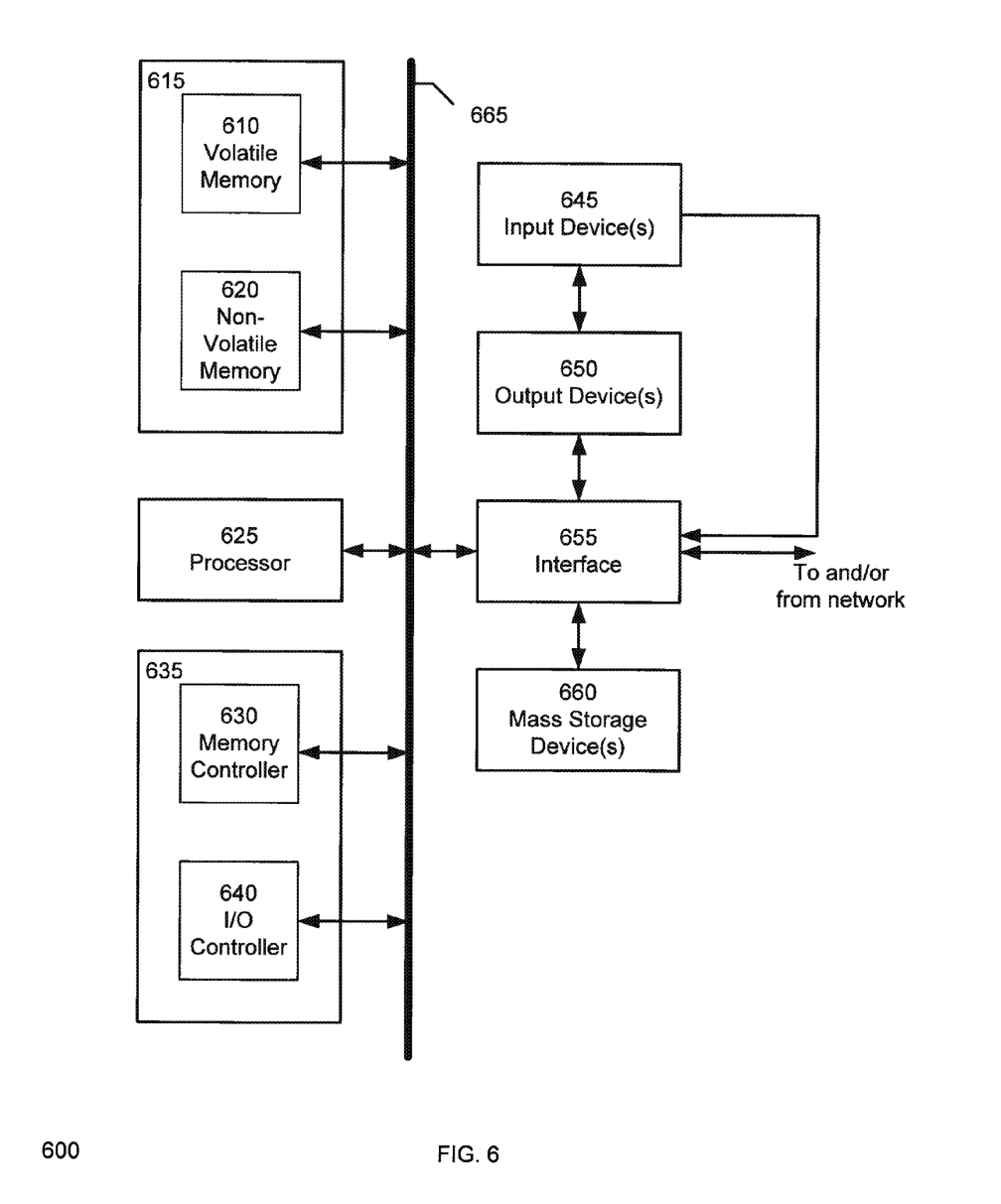
FIG. 6 depicts a system implementing the fast platform restart in accordance with one embodiment of the invention.

FIG. 6 illustrates a block diagram of a system 600 to implement the methods disclosed herein according to an embodiment. The system 600 includes but is not limited to, a desktop computer, a laptop computer, a notebook computer, a personal digital assistant (PDA), a server, a workstation, a cellular telephone, a mobile computing device, an Internet appliance or any other type of computing device. In another embodiment, the system 600 used to implement the methods disclosed herein may be a system on a chip (SOC) system.

The system 600 includes a chipset 635 with a memory controller 630 and an input/output (I/O) controller 640. A chipset typically provides memory and I/O management functions, as well as a plurality of general purpose and/or special purpose registers, timers, etc. that are accessible or used by a processor 625. The processor 625 may be implemented using one or more processors.

The memory controller 630 performs functions that enable the processor 625 to access and communicate with a main memory 615 that includes a volatile memory 610 and a non-volatile memory 620 via a bus 665. In one embodiment of the invention, the modified BIOS 180 is stored in the non-volatile memory 620. In other embodiment of the invention, the pre-verifier 312 is stored in the non-volatile memory 620.

The volatile memory 610 includes but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 620 includes but is not limited by, flash memory, Read Only Memory (ROM), Electrically Erasable Programmable Read Only Memory (EEPROM), and/or any other desired type of memory device.

Memory 615 stores information and instructions to be executed by the processor 625. Memory 615 may also stores temporary variables or other intermediate information while the processor 625 is executing instructions.

The system 600 includes but is not limited to, an interface circuit 655 that is coupled with bus 665. The interface circuit 655 is implemented using any type of well known interface standard including, but is not limited to, an Ethernet interface, a universal serial bus (USB), a third generation input/output interface (3GIO) interface, and/or any other suitable type of interface.

One or more input devices 645 are connected to the interface circuit 655. The input device(s) 645 permit a user to enter data and commands into the processor 625. For example, the input device(s) 645 is implemented using but is not limited to, a keyboard, a mouse, a touch-sensitive display, a track pad, a track ball, and/or a voice recognition system.

One or more output devices 650 connect to the interface circuit 655. For example, the output device(s) 650 are implemented using but are not limited to, light emitting displays (LEDs), liquid crystal displays (LCDs), cathode ray tube (CRT) displays, printers and/or speakers). The interface circuit 655 includes a graphics driver card.

The system 600 also includes one or more mass storage devices 660 to store software and data. Examples of such mass storage device(s) 660 include but are not limited to, floppy disks and drives, hard disk drives, fast flash disk drives, solid state hard drives, compact disks and drives, and digital versatile disks (DVD) and drives.

The interface circuit 655 includes a communication device such as a modem or a network interface card to facilitate exchange of data with external computers via a network. The communication link between the system 600 and the network may be any type of network connection such as an Ethernet connection, a digital subscriber line (DSL), a telephone line, a cellular telephone system, a coaxial cable, etc.

Access to the input device(s) 645, the output device(s) 650, the mass storage device(s) 660 and/or the network is typically controlled by the I/O controller 640 in a conventional manner. In particular, the I/O controller 640 performs functions that enable the processor 625 to communicate with the input device(s) 645, the output device(s) 650, the mass storage device(s) 660 and/or the network via the bus 665 and the interface circuit 655.

While the components shown in FIG. 16 are depicted as separate blocks within the system 600, the functions performed by some of these blocks may be integrated within a single semiconductor circuit or may be implemented using two or more separate integrated circuits. For example, although the memory controller 630 and the I/O controller 640 are depicted as separate blocks within the chipset 635, one of ordinary skill in the relevant art will readily appreciate that the memory controller 630 and the I/O controller 640 may be integrated within a single semiconductor circuit.

Although examples of the embodiments of the disclosed subject matter are described, one of ordinary skill in the relevant art will readily appreciate that many other methods of implementing the disclosed subject matter may alternatively be used. For example, the order of execution of the blocks in the flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method to restart a computing platform comprising:
    obtaining, by the computing platform, from an input/output (IO) device coupled with the computing platform at least one register setting stored on the IO device that describes a hardware state of the IO device;
    saving, by the computing platform, the obtained at least one register setting of the IO device in storage of the computing platform, the storage being separate from the IO device;
    trapping a software initiated reset request (SIRR) of the computing platform;
    restoring, by the computing platform, the IO device coupled with the computing platform to a previous hardware state responsive to the trapping, the restoring including restoring at least one register of the IO device with the saved at least one register setting previously obtained from the IO device; and
    launching an operating system (OS) to restart the computing platform responsive to the restoration.

2. The method of claim 1 further comprising:
    converting the SIRR into a central processing unit (CPU) only initialization reset request when the SIRR is trapped; and
    initializing the CPU responsive to the conversion.

3. The method of claim 1 further comprising initializing the computing platform.

4. The method of claim 3, wherein initializing the computing platform comprises saving a copy of a previous OS loader image, wherein a basic IO system (BIOS) of the platform supports extensible firmware interface (EFI).

5. The method of claim 4 further comprising restoring an OS loader of the computing platform with the copy of the previous OS loader image.

6. The method of claim 3 wherein initializing the computing platform comprises:
    determining that an OS loader of the computing platform is attempting to transition into runtime; and
    maintaining boot services memory to facilitate ability of the computing platform to retain its firmware infrastructure during the restart of the computing platform, wherein a basic IO system (BIOS) of the computing platform supports extensible firmware interface (EFI).

7. The method of claim 3 wherein initializing the computing platform comprises copying data associated with a legacy based basic IO system (BIOS) memory region of the computing platform into a buffer, wherein the buffer is indicated as unavailable to the OS or to an OS loader in a memory map.

8. The method of claim 7, wherein the data associated with the legacy based BIOS memory region is data in a BIOS data area (BDA) or data in an extended BDA (EBDA).

9. The method of claim 7 further comprising:
    restoring the legacy based BIOS memory region of the computing platform with the copied data;
    initiating a boot strap loader to launch the OS to restart the computing platform.

10. A non-transitory computer readable medium having instructions stored thereon which, in response to execution by a processor of a computing platform, cause the processor to restart the computing platform by causing the computing to:
    obtain from an input/output (JO) device coupled with the computing platform, at least one register setting stored on the IO device that describes a hardware state of the IO device;
    save the obtained at least one register setting of the IO device in storage of the computing platform, the storage being separate from the IO device;
    trap a software initiated reset request (SIRR) of the computing platform;
    restore the IO device coupled with the computing platform to a previous hardware state responsive to the trapping through restoration of at least one register of the IO device with the saved at least one register setting previously obtained from the IO device; and
    launch an operating system (OS) to restart the computing platform responsive to the restoration.

11. The non-transitory computer-readable medium of claim 10, wherein the instructions are further configured, in response to execution, to cause the computing platform to:
    convert the SIRR into a central processing unit (CPU) only initialization reset request when the SIRR is trapped; and
    initialize the CPU responsive to the conversion.

12. The non-transitory computer-readable medium of claim 10, wherein the instructions are further configured, in response to execution, to cause the computing platform to initialize the computing platform.

13. The non-transitory computer-readable medium of claim 12, wherein the instructions are configured to initialize the computing platform through a save of a copy of a previous OS loader image, wherein a basic IO system (BIOS) of the computing platform supports extensible firmware interface (EFI).

14. The non-transitory computer-readable medium of claim 13, wherein the instructions are further configured, in response to execution, to restore an OS loader of the computing platform with the copy of the previous OS loader image.

15. The non-transitory computer-readable medium of claim 12 wherein the instructions are configured to initialize the computing platform through:
    a determination that an OS loader of the computing platform is attempting to transition into runtime; and
    maintenance of boot services memory to facilitate ability of the computing platform to retain its firmware infrastructure during the restart of the computing platform, wherein a basic IO system (BIOS) of the computing platform supports extensible firmware interface (EFI).

16. The non-transitory computer-readable medium of claim 12 wherein the instructions are configured to initialize the computing platform through copy of data associated with a legacy based basic IO system (BIOS) memory region of the computing platform into a buffer, wherein the buffer is indicated as unavailable to the OS or to an OS loader in a memory map.

17. The non-transitory computer-readable medium of claim 16, wherein the data associated with the legacy based BIOS memory region is data in a BIOS data area (BDA) or in an extended BDA (EBDA).

18. The non-transitory computer-readable medium of claim 16 the instructions are further configured, in response to execution, to:
    restore the legacy based BIOS memory region of the computing platform with the copied data; and
    initiate a boot strap loader to launch the OS to restart the computing platform.

19. A computing platform comprising:
    an input/output (IO) device coupled with the computing platform;
    an operating system (OS) coupled with the computing platform;
    a storage device separate from the IO device; and
    a basic input/output system (BIOS) module coupled with the IO device and configured to operate to:
        obtain, from the IO device, at least one register setting stored on the IO device that describes a hardware state of the IO device;
        save the obtained at least one register setting of the IO device in the storage device;
        trap a software initiated reset request (SIRR) of the OS;
        restore the IO device to a previous hardware state responsive to the trapping through restoration of at least one register of the IO device with the saved at least one register setting previously obtained from the IO device; and
    launch the OS to restart the computing platform responsive to the restoration.

20. The computing platform of claim 19 further comprising a central processing unit (CPU) coupled with the computing platform and wherein the BIOS module is further configured to operate to:
    convert the SIRR into a CPU only initialization reset request when the SIRR is trapped; and
    initialize the CPU responsive to the conversion.

21. The computing platform of claim 19, wherein the BIOS module is further configured to operate to initialize the computing platform.

22. The computing platform of claim 21, wherein the BIOS module is configured to operate to initialize the computing platform through a save of a copy of a previous OS loader image, wherein the BIOS module supports extensible firmware interface (EFI).

23. The computing platform of claim 22, wherein the BIOS module is further configured to operate to restore an OS loader of the computing platform with the copy of the previous OS loader image.

24. The computing platform of claim 21, wherein the BIOS module to initialize the computing platform is further configured to operate to:
    determine that an OS loader of the computing platform is attempting to transition into runtime; and
    maintain boot services memory to facilitate ability of the computing platform to retain its firmware infrastructure during the restart of the computing platform, wherein the BIOS module supports extensible firmware interface (EFI).

25. The computing platform of claim 21, wherein the BIOS module is configured to initialize the computing platform through copy of data associated with a legacy based BIOS memory region of the computing platform into a buffer, wherein the buffer is indicated as unavailable to the OS or to an OS loader in a memory map.

26. The computing platform of claim 25, wherein the data associated with the legacy based BIOS memory region in the BIOS module is data in a BIOS data area (BDA) or in an extended BDA (EBDA).

27. The computing platform of claim 25, wherein the BIOS module is further configured to operate to:
    restore the legacy based BIOS memory region of the computing platform with the copied data;
    initiate a boot strap loader to launch the OS to restart the computing platform.

* * * * *